United States Patent [19]

Calundann et al.

[11] 4,048,139

[45] Sept. 13, 1977

[54] RENDERING POLYBENZIMIDAZOLE SOLID MATERIALS MORE RESISTANT TO DARKENING UPON EXPOSURE TO LIGHT

[75] Inventors: Gordon W. Calundann, North Plainfield; Edward J. Powers, Gillette, both of N.J.

[73] Assignee: Celanese Corporation, New York, N.Y.

[21] Appl. No.: 549,040

[22] Filed: Feb. 11, 1975

[51] Int. Cl.$^2$ .......................... C08K 3/22; C08K 3/30; C08K 5/34; C08K 5/36
[52] U.S. Cl. .................. 260/45.8 N; 260/30.8 DS; 260/32.6 N; 260/37 N; 260/45.75 B; 260/45.75 C; 260/45.75 F
[58] Field of Search ............... 260/45.7 R, 78.4 R, 260/32.6 N, 45.85 R, 45.75 B, 45.75 C, 45.75 F, 37 N, 45.8 N, 30.8 DS; 264/205

[56] References Cited

U.S. PATENT DOCUMENTS

| 2,895,948 | 7/1959 | Brinker ........................... 260/78.4 R |
| 3,174,947 | 3/1965 | Marvel et al. ................... 260/78.4 R |
| 3,396,143 | 8/1968 | Newland et al. ............. 260/45.75 F |
| 3,427,278 | 2/1969 | Siuta ............................. 260/45.75 F |
| 3,428,598 | 2/1969 | Matsubayashi et al. ...... 260/45.75 F |
| 3,470,131 | 9/1969 | Baitinger ....................... 260/45.75 F |
| 3,547,882 | 12/1970 | Corbett et al. ................. 260/45.75 F |
| 3,836,500 | 9/1974 | Calundann ..................... 260/45.7 R |
| 3,931,274 | 1/1976 | Thomas et al. ............... 260/45.75 B |
| 3,942,950 | 3/1976 | Powers ................................ 8/162 R |
| 3,971,755 | 7/1976 | Zannucci et al. ............. 260/45.75 F |

OTHER PUBLICATIONS

"Handbook of Adhesives", 1962, Skeist, pp. 223, 447.

*Primary Examiner*—H.S. Cockeram

[57] ABSTRACT

A route is provided for the formation of a polybenzimidazole solid material having an enhanced resistance to undergo the usual color darkening upon exposure to light. A minor concentration of a finely divided pigment found capable of stabilizing the background color inherently manifest by the polybenzimidazole polymer is dispersed in a solution of the polybenzimidazole, and the solvent is removed to produce a polybenzimidazole solid having the pigment substantially uniformly distributed therein. The pigment utilized may be arsenic thioarsenate, copper phthalocyanine, anatase titanium dioxide, or mixtures thereof. Fibers, films, three-dimensional shaped articles, etc. may be formed from the color stabilized polybenzimidazole.

32 Claims, No Drawings

RENDERING POLYBENZIMIDAZOLE SOLID MATERIALS MORE RESISTANT TO DARKENING UPON EXPOSURE TO LIGHT

BACKGROUND OF THE INVENTION

Polybenzimidazoles, and particularly aromatic polybenzimidazoles, are characterized by a high degree of thermal stability. They may be shaped to form fibers, films and other articles of wide utility which show great resistance to degradation by heat, hydrolytic and oxidizing media.

It has been found, however, that such shaped polybenzimidazole articles darken rapidly, for example, in a few hours, from a relatively light gold color to a dark, coffee or chocolate brown. Although it is not understood, it is believed that the darkening is due to some type of photodegradability of the polymer in which the free amine end groups present in the polymer are affected. For example, it has been postulated that hydrogen peroxide may be formed from the polybenzimidazole polymer under certain conditions, including the presence of air and moisture, which would tend to react with the polymer chain. In addition, it has been suggested that the repeating units of the polymer backbone may be oxidized to a colored quinoid structure.

Regardless, however, the problem is known. A number of solutions have been attempted to impart color stability to the polybenzimidazole materials without success. For example, commercial antioxidants and ultra-violet light absorbers have been added to polybenzimidazole films and other articles. In addition, a number of treatments to polybenzimidazole yarns, films and other shaped articles such as scouring with nitrous acid and other oxidizing or reducing materials, have been attempted. In addition, a chrome treatment of the material has been attempted before dyeing. While some of these treatments have been found to lighten the ground color of the polybenzimidazole material, the material still darkens upon exposure to light.

Commonly assigned U.S. Pat. No. 3,836,500 to Gordon W. Calundann and George R. Ferment discloses that the color stability of polybenzimidazole articles may be improved through the incorporation of certain dissolved stabilizing reagents in a solution of the polymer prior to article formation. Reagents there utilized are: (1) an aliphatic carboxylic acid anhydride having 1 to about 6 carbon atoms, (2) aliphatic carboxylic acid halides having 1 to about 6 carbon atoms, (3) tosyl chloride, and (4) 2,4-dinitrofluorobenzene.

Commonly assigned U.S. Ser. No. 536,807, filed Dec. 27, 1974 (now U.S. Pat. No. 3,942,950), of Edward J. Powers and Walter P. Hassinger, entitled "Improved Process for the Dyeing of Polybenzimidazole Fibers with Anionic Dyestuffs" discloses a technique whereby polybenzimidazole fibers may be successfully dyed while accomplishing complete and uniform dye penetration. The ability to produce satisfactorily dyed polybenzimidazole articles which resist gradual darkening upon exposure to light over extended periods of time is considered to be of prime importance if such articles are to maintain the desired aesthetically pleasing shades in combination with their other highly desirable utilitarian characteristics.

It is an object of the present invention to provide a process wherein the usual color darkening of a polybenzimidazole solid material upon exposure to light is diminished.

It is an object of the present invention to provide a process wherein the ground color inherently exhibited by polybenzimidazole polymer may be stabilized and rendered more constant during use.

It is an object of the present invention to improve the lightfastness of solid polybenzimidazole polymer.

It is an object of the present invention to provide a polybenzimidazole fibrous material exhibiting an enhanced resistance to undergo the usual darkening upon exposure to light.

It is another object of the present invention to provide a polybenzimidazole fibrous material having improved color stabilization without adversely influencing its desirable non-burning characteristics.

It is a further object of the present invention to provide a solution of a polybenzimidazole polymer which is capable of forming polybenzimidazole shaped articles having an enhanced resistance to darkening upon exposure to light.

These and other objects, as well as the scope, nature, and utilization of the present invention will be apparent to those skilled in the art from the following description and appended claims.

SUMMARY OF THE INVENTION

It has been found that an improved solution suitable for the formation of shaped polybenzimidazole articles comprises:

a. a solvent capable of dissolving the polybenzimidazole which is selected from the group consisting essentially of N,N-dimethylacetamide, N,N-dimethylformamide, dimethylsulfoxide, and N-methyl-2-pyrrolidone, b. dissolved polybenzimidazole, and c. a minor concentration sufficient to stabilize the color of the resulting shaped polybenzimidazole article of a finely divided pigment which is dispersed in the solution selected from the group consisting essentially of arsenic thioarsenate, copper phthalocyanine, anatase titanium dioxide, and mixtures of the foregoing.

It has been found that an improved process for the formation of a polybenzimidazole solid material having an enhanced resistance to undergo the usual color darkening upon exposure to light comprises:

a. forming a solution of polybenzimidazole in a solvent selected from the group consisting essentially of N,N-dimethylacetamide, N,N-dimethylformamide, dimethylsulfoxide, and N-methyl-2-pyrrolidone, with the solution having dispersed therein a minor concentration of finely divided pigment selected from the group consisting essentially of arsenic thioarsenate, copper phthalocyanine, anatase titanium dioxide, and mixtures of the foregoing, and b. substantially removing said solvent from said polybenzimidazole to form a polybenzimidazole solid material wherein said finely divided pigment is substantially uniformly dispersed therein in a concentration of about 0.1 to 8 percent by weight based upon the weight of the polybenzimidazole.

It has been found that a polybenzimidazole fibrous material exhibiting an enhanced resistance to undergo the usual darkening upon exposure to light comprises about 0.1 to 8 percent by weight based upon the weight of the polybenzimidazole of a finely divided pigment substantially uniformly dispersed therein selected from the group consisting essentially of arsenic thioarsenate, copper phthalocyanine, anatase titanium dioxide, and mixtures of the foregoing.

DESCRIPTION OF PREFERRED EMBODIMENTS

Polybenzimidazoles are a known class of heterocyclic polymers. Typical polymers of this class are described in U.S. Pat. No. 2,895,948, U.S. Pat. No. Re. 26,065, and in the Journal of Polymer Science, Vol. 50, pages 511–539 (1961) which are herein incorporated by reference. The polybenzimidazoles consist essentially of recurring units of the following Formulas I and II. Formula I is:

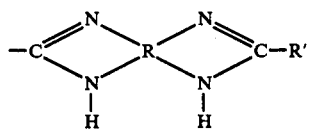

wherein R is a tetravalent aromatic nucleus, preferably symmetrically substituted, with the nitrogen atoms forming the benzimidazole rings being paired upon adjacent carbon atoms, i.e. ortho carbon atoms of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

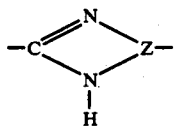

wherein Z is an aromatic nucleus having the nitrogen atoms forming the benzimidazole ring paired upon adjacent carbon atoms of the aromatic nucleus.

Preferably, aromatic polybenzimidazoles are selected, e.g. polymers consisting essentially of the recurring units of Formulas I and II wherein R' is at least one aromatic ring or a heterocyclic ring.

As set forth in U.S. Pat. No. Re. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon a carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'-(m-phenylene)-5,5'-bibenzimidazole;
poly-2,2'-(pyridylene 3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-dimidazobenzene;
poly-2,2'-cyclohexeneyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole) sulfone;
poly-2,2'-(m-phenylene)-5,5'-di(benzimidazole) methane;
poly-2',2"-(m-phenylene)-5',5"-di(benzimidazole) propane-2,2; and
poly-2',2"-(m-phenylene)-5',5"-di(benzimidazole) ethylene-1,2
where the double bonds of the ethylene groups are intact in the final polymer.

The preferred polybenzimidazole for use in the present process is poly-2,2'-(m-phenylene)-5,5'-bibenzimidazole, the recurring unit of which is:

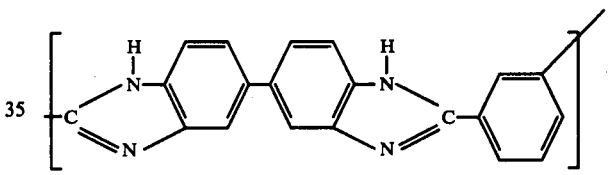

Any polymerization process known to those skilled in the art may be employed to prepare the polybenzimidazole which may then be formed into a fibrous material. Representative techniques for preparing the polybenzimidazole are disclosed in U.S. Pat. Nos. 3,509,108; 3,549,603; and 3,551,389, which are assigned to the assignee of the present invention and are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3, the inherent viscosity (I.V.) as used herein being determined from a solution of 0.4 grams of the polymer in 100 ml. of 97 percent H$_2$SO$_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.6, e.g. 0.80 to 1.1 or more.

The temperature employed in the second stage is at least 250° C., preferably at least 325° C., and more preferably from about 350° to 425° C. The second stage reaction generally takes at least 0.5 hour, and preferably from about 1 to 4 hours or more.

A particularly preferred method for preparing the polybenzimidazole is disclosed in the aforesaid U.S. Pat. No. 3,509,108. As disclosed therein aromatic polybenzimidazoles may be prepared by initially reacting the monomer in a melt phase polymerization at a temperature above about 200° C. and a pressure above 50 psi (e.g., 300 to 600 psi) and then heating the resulting reaction product in a solid state polymerization at a temperature above about 300° C. (e.g., 350° to 500° C.) to yield the final product.

The polybenzimidazole is dissolved in an appropriate solvent and a minor concentration of the finely divided pigment (described hereafter) is dispersed therein. The solvents suitable for use in the present invention are N,N-dimethylacetamide, N,N-dimethylformamide, dimethylsulfoxide, and N-methyl-2-pyrrolidone. The particularly preferred solvent is N,N-dimethylacetamide. The concentration of the polybenzimidazole in the solution may be varied widely. For instance, when forming a solution suitable for extrusion through a shaped orifice to form a fibrous material, the polybenzimidazole may be dissolved in the solvent to yield a final solution containing the polymer in a concentration of about 10 to 45 percent by weight based upon the total weight of the solution, preferably from about 20 to 30 percent by weight. When the solution is to be used for the casting of a film, the polybenzimidazole may be dissolved in the solvent in a concentration of about 5 to 30 percent by weight based upon the total weight of the solution, preferably from about 15 to 25 percent by weight. When the solution is to be used for the ultimate precipitation of a molding compound, the polybenzimidazole may be dissolved in the solvent in a concentration of about 5 to 35 percent by weight based upon the total weight of the solution, preferably from about 15 to 25 percent by weight.

One suitable means for dissolving the polymer in the solvent is by mixing the materials at a temperature above the atmospheric boiling point of the solvent, for example 25° to 120° C. above such boiling point, and at a pressure of 2 to 15 atmospheres for a period of 1 to 5 hours.

The finely divided pigments (described hereafter) may be dispersed in the solution of polybenzimidazole polymer by introduction into the previously formed solution with stirring. A preferred procedure for introducing the pigment is to add a concentrated suspension of the pigment in the same solvent to the polymer solution in a pressure vessel and to tumble the mixture at an elevated temperature until good mixing is accomplished. The concentrated suspension of the pigment initially may be formed by ball milling with the solvent. Alternatively, the dry pigment may be ball milled directly into the solution of polybenzimidazole polymer. The pigment is introduced in a minor concentration sufficient to stabilize the color of the resulting polybenzimidazole solid which is formed upon the subsequent removal of the solvent (described hereafter). For instance, the finely divided pigment may be provided in the solution in a concentration of about 0.1 to 8 percent by weight based upon the weight of the dissolved polybenzimidazole, and preferably in a concentration of about 0.2 to 3 percent by weight.

The finely divided pigments are insoluble in the solvent and commonly possess a number average particle size up to about 5 microns, e.g. about 0.05 to 5 microns, and preferably about 0.1 to 2 microns. When the solution containing dissolved polybenzimidazole polymer is ultimately to be used for fiber formation, care must be taken to insure that the dispersed pigment is not of sufficient particle size to obstruct the orifice of the spinning machine.

The finely divided pigments utilized in the present process have surprisingly been found capable of enhancing the resistance of a polybenzimidazole solid material to undergo the usual color darkening upon exposure to light and may be arsenic thioarsenate, copper phthalocyanine, anatase titanium dioxide, or mixtures of the same.

The arsenic thioarsenate pigment is free-flowing yellow powder and possesses the structural formula As(AsS$_4$). While arsenic thioarsenate is a recognized antioxidant, it was found that other well known antioxidants are unsuitable for use in the present invention and fail to impart the desired color stability to a polybenzimidazole. It has been found that the presence of the yellow arsenic thioarsenate within the light brown polybenzimidazole polymer results in practically no color change. Also, the usual darkening upon exposure to light is greatly retarded. Particularly satisfactory results are achieved when a minor concentration (e.g. 0.3 percent by weight based upon the weight of the polybenzimidazole) of a UV light absorber is used in combination with the arsenic thioarsenate. A preferred UV light absorber is a benzylidene malonic ester available from the American Cyanamid Corporation under the designation Cyasorb UV1988 absorber.

The copper phthalocyanine pigment is preferably of the beta-type which tends to be more stable than the alpha-type. The copper phthalocyanine has the ability to color the polybenzimidazole to a green shade which resists darkening upon exposure to light and thereby protects the polybenzimidazole.

The anatase titanium dioxide pigment is sometimes identified as octahedrite and serves to lighten and deluster the color of the polybenzimidazole. It has been found however that the presence of the anatase titanium dioxide pigment surprisingly serves an additional role of providing stabilization with respect to the usual color darkening upon exposure to light. Other inorganic pigments, such as rutile titanium dioxide, and zinc sulfide lack this highly desirable stabilization property when incorporated in a polybenzimidazole.

As previously indicated, other additives such as antioxidants and UV light absorbers optionally may be utilized in combination with the above-identified pigments.

The solvent is removed from the solution of polybenzimidazole to form a polybenzimidazole solid material wherein the finely divided pigment is substantially uniformly dispersed therein in a concentration of about 0.1 to 8 percent by weight based upon the weight of the polybenzimidazole (preferably in a concentration of about 0.2 to 3 percent by weight). For instance, the solvent may be removed via a conventional dry spinning technique by extrusion through a shaped orifice into an evaporative atmosphere to form a fibrous material. The solvent may be removed by a conventional casting technique wherein the solvent is evaporated from a thin layer of solution to form a film. Alternatively, the solvent may be removed by contact with agitation with a solvent-miscible non-solvent for the polybenzimidazole (e.g. ketones such as acetone and methylethyl ketone, alcohols such as methanol and ethanol, aromatics such as benzene and toluene, chlorinated aliphatics such as chloroform and methylene chloride, and water) and the resulting polybenzimidazole recovered as a particulate solid which is suitable for use as a molding compound which may be sintered to form a three-dimensional shaped article. In all instances, the pigment is substantially uniformly dispersed in the resulting polybenzimidazole solid material and the product exhibits an enhanced resistance to undergo the usual color darkening upon exposure to light.

In a particularly preferred embodiment of the invention the polybenzimidazole solution containing dispersed pigment is dry spun to form a fibrous material. For example, the solutions may be extruded through a spinneret into a conventional type downdraft spinning column containing a circulating inert gas such as nitrogen, noble gases, combustion gases, or superheated stem. Conveniently, the spinneret face is at a temperature of from about 100° to 170° C., the top of the column from about 120° to 220° C., the middle of the column from about 140° to 250° C., and the bottom of the column from about 160° to 320° C. After leaving the spinning column, the continuous filamentary materials are taken up, for example, at a speed within the range of about 50 to 350 meters or more per minute. If the continuous filamentary materials are to be washed while wound on bobbins, the resulting "as-spun" materials may be subjected to a slight steam drawing treatment at a draw ratio of from about 1.05:1 to 1.5:1 in order to prevent the fibers from relaxing and falling off the bobbin during the subsequent washing step. Further details with respect to a method for dry-spinning a continuous length of a polybenzimidazole fibrous material are shown in U.S. Pat. No. 3,502,756 to Bohrer et al. which is assigned to the same assignee as the present invention and is herein incorporated by reference.

The continuous length of polybenzimidazole fibrous material next may be washed so as to remove at least the major portion of residual spinning solvent, e.g., so that the washed materials contain less than about 1 percent by weight solvent based on the weight of the continuous filamentary material, and preferably so as to obtain an essentially spinning solvent-free fibrous material (i.e. a fibrous material containing less than about 0.1 percent solvent by weight). Typically, a simple water wash is employed; however, if desired, other wash material such as acetone, methanol, methylethyl ketone and similar solvent-miscible and volatile organic solvents may be used in place of or in combination with the water. The washing operation may be conducted by collecting the polybenzimidazole fibrous material on perforated rolls or bobbins, immersing the rolls in the liquid wash bath and pressure washing the fibrous material, for example, for about 2 to 48 hours or more. Alternatively, the continuous length of polybenzimidazole fibrous material may be washed on a continuous basis by passing the fibrous material in the direction of its length through one or more liquid wash baths (e.g. for 1 to 10 minutes). Any wash technique known to those skilled in the art may be selected. The occluded pigment is not removed by the washing.

The continuous length of polybenzimidazole fibrous material may next be dried to remove the liquid wash bath by any convenient technique. For instance, the drying operation for bobbins of yarn may be conducted at a temperature of about 150° to 300° C. for about 2 to 100 hours or more. Alternatively, the continuous length of polybenzimidazole fibrous material may be dried on a continuous basis by passing the fibrous material in the direction of its length through an appropriate drying zone (e.g. an oven provided at 300° to 400° C. for 1 to 2 minutes). If drying is employed, preferably the drying temperature does not exceed about 250° C. for several hours or 400° C. for more than 1 minute, as above these limits degradation of the fiber may occur.

The polybenzimidazole fibrous material preferably next may be hot drawn at a draw ratio of about 2:1 to 5:1 in order to enhance its orientation. Representative draw procedures are disclosed in commonly assigned U.S. Pat. Nos. 3,622,660, and 3,849,529.

The polybenzimidazole fibrous material when intended for textile applications is usually crimped and cut into stable form. For example a crimp of about 10 to 15 crimps per inch may be imparted to the same prior to cutting into lengths of about 2 inches. This crimped staple fiber may then be spun into yarns of from about 14's to 60's cotton count. Fabric nest may be formed by weaving or knitting.

The theory whereby the arsenic thioarsenate, copper phthalocyanine, and anatase titanium dioxide pigments are capable of enhancing the resistance of the polybenzimidazole to undergo the usual color darkening upon exposure to light is considered to be complex and incapable of simple explanation.

The following examples are given as specific illustrations of the invention. It should be understood, however, that the invention is not limited to the specific details set forth in the examples.

EXAMPLE I

Poly-2,2'-(m-phenylene)-5,5'-bibenzimidazole is prepared in accordance with Example I of U.S. Pat. No. 3,509,108 and is dissolved in N,N-dimethylacetamide in a concentration of 23 percent by weight based upon the total weight of the solution. 0.5 percent by weight of finely divided arsenic thioarsenate pigment based upon the weight of the poly-2,2'-(m-phenylene)-5,5-bibenzimidazole is dispersed within the solution via ball milling. The arsenic thioarsenate is available from the El Monte Chemical Co. under the designation of Arsenone S arsenic thioarsenate, and possesses a number average particle size of about one micron.

The resulting solution containing the dispersed pigment has a viscosity of about 1000 poise at 30° C., and is dry spun by extrusion through a shaped orifice to form a fibrous material and is subsequently hot drawn in accordance with conventional techniques. Arsenic thioarsenate pigment is substantially uniformly dispersed in the resulting fibrous material in a concentration of about 0.5 percent by weight based upon the weight of the polybenzimidazole. The resulting fibrous material is colorstable and maintains its color without any significant darkening for over 10 standard fading hours in a Carbon Arc Fade-Ometer.

Fibrous materials which lack the arsenic thioarsenate pigment darken very rapidly upon exposure to sunlight.

EXAMPLE II

Example I is repeated with the exception that 0.2 percent by weight arsenic thioarsenate and 0.3 percent by weight benzylidene malonic ester UV absorber (i.e. Cyasorb UV 1988 absorber available from the American Cyanamid Corporation) are uniformly dispersed in the resulting fibrous material. The color stability of the product is found to be even greater.

EXAMPLE III

Example I is repeated with the exception that beat-copper phthalocyanine pigment is substituted for the arsenic thioarsenate pigment. The pigment colors the fibrous material to an attractive green color. The pigment is available from the Chemetron Corporation under the designation of Phthalo Blue G beta-copper phthalocyanine pigment, and possesses a number average particle size of about one micron.

Substantially similar results are achieved with respect to resistance to darkening upon exposure to light.

EXAMPLE IV

Example I is repeated with the exception that anatase titanium dioxide pigment is substituted for the arsenic thioarsenate pigment. The pigment is available from the American Cyanamid Corporation under the designation of Calcotone White anatase titanium dioxide pigment, and possesses a number average particle size of about 0.2 micron. The pigment serves to lighten and to deluster the resulting fibrous material.

Substantially similar results are achieved with respect to resistance to darkening upon exposure to light.

EXAMPLE V

Arsenic thioarsenate pigment, arsenic thioarsenate pigment in combination with UV absorber, beta-copper phthalocyanine pigment, and anatase titanium dioxide pigment are charged to four separate solutions of poly-2,2'-(m-phenylene)-5,5'-bibenzimidazole in N,N-dimethylacetamide. The polymer is dissolved in the solutions in a concentration of 23 percent by weight based upon the total weight of the solution, and 0.2, 0.2, 3, and 1 percent by weight respectively of each pigment is dispersed therein based upon the weight of the poly-2,2'-(m-phenylene)-5,5'-bibenzimidazole. A control solution (without any pigment) also is prepared. Films are formed from each solution by casting the solutions upon a glass support and drying at 100° C. under reduced pressure with a slight air flow over the film. After drying the films are readily stripped from the support. Color shade changes in the films after 10 SFH (Standard Fading Hours) in a Carbon Arc Fade-Ometer are reported below. The results illustrate the enhanced resistance of the films formed in accordance with the present invention to undergo the usual color darkening upon exposure to light.

| Pigment | Film Color[1] as cast | after 10SFH | Contrast[2] |
|---|---|---|---|
| None (control) | 1 | 6 | P |
| Arsenic thioarsenate | 1 | 2 | G |
| Arsenic thioarsenate plus Cyasorb UV 1988 (0.3%) | 1 | 1 | E |
| Beta-copper phthalocyanine | Green | Green | E |
| Anatase titanium dioxide | <1 | 2 | G |

[1]Color is rated by comparison to a set of polymethylmethacrylate standards number 1 to 6 containing 1.0% to 2.0% amber dye respectively, in 0.2% increments.
[2]Adjective rating (E is excellent, G is good, F is fair and P is poor) as described in Federal Test Method Standard No. 191, Method 5660.0, Section 5.7.2.

COMPARATIVE EXAMPLE

Various known inorganic additives, antioxidants, ultra-violet light absorbers and mixtures are added in various amounts (by weight of the polymer) to a 15% solution of the polybenzimidazole of Example I in N,N-dimethylacetamide. Films are cast and Film Color is determined before and after 10 SFH in the Carbon Arc Fade-Ometer in the same manner as Example IV. The additives, amounts and results are shown below.

| Additive (amount) | Film Color As cast | After 10 SFH |
|---|---|---|
| None (Control) | 1 | >6 |
| Rutile titanium dioxide | 1 | >6 |
| Zinc sulfide | 1 | >6 |
| Santowhite[1] (5.0%) | 2 | 4 |
| Cyasorb UV1988[2] (5.0%) | 1 | 4 |
| Santowhite (0.4%) plus Cyasorb UV1988 (0.6%) | 1 | 3 |
| Santowhite (2.0%) plus Cyasorb UV1988 (3.0%) | 1 | 6 |
| Irganox 1076[3] (5.0%) | 4 | 3 |
| Irganox 1076 (0.4%) plus Cyasorb UV1988 (0.6%) | 1 | 3 |
| Irganox 1076 (2.0%) plus Cyasorb UV1988 (3.0%) | 4 | 5 |
| Irganox 1010[4] (5.0%) | 1 | 4 |
| Cyasorb UV207[5] (5.0%) | 2 | 4 |
| Irganox 1010 (0.3%) plus Cyasorb UV207 (0.6%) | 1 | 3 |
| Irganox 1010 (2.0%) plus Cyasorb UV207 (3.0%) | 3 | 5 |

[1]Santowhite is an alkylidene bisphenol antioxidant available from the Monsanto Company.
[2]Cyasorb UV1988 is a benzylidene malonic ester ultra-violet absorber available from the American Cyanamid Company.
[3]Irganox 1076 is an alkyl phenol antioxidant available from the Geigy-Ciba Chemical Company
[4]Irganox 1010 is an alkylidene bisphenol antioxidant availabe from the Geigy-Ciba Chemical Company.
[5]Cyasorb UV207 is a hydroxybenzophenone ultra-violet absorber available from the American Cyanamid Company.

Although the invention has been described with preferred embodiments, it is to be understood that variations and modifications may be resorted to as will be apparent to those skilled in the art. Such variations and modifications are to be considered within the purview and the scope of the claims appended hereto.

We claim:

1. An improved process for the formation of a polybenzimidazole solid material having an enhanced resistance to undergo the usual color darkening upon exposure to light comprising:

a. forming a solution of polybenzimidazole in a solvent selected from the group consisting essentially of N,N-dimethyacetamide, N,N-dimethylformamide, dimethylsulfoxide, and N-methyl-2-pyrrolidone, with said solution having dispersed therein a minor concentration of finely divided pigment selected from the group consisting essentially of arsenic thioarsenate, copper phthalocyanine, anatase titanium dioxide, and mixtures of the foregoing, and b. substantially removing said solvent from said polybenzimidazole to form a polybenzimidazole solid material wherein said finely divided pigment is substantially uniformly dispersed therein in a concentration of about 0.1 to 8 percent by weight based upon the weight of the polybenzimidazole.

2. An improved process in accordance with claim 1 for the formation of a polybenzimidazole solid material having an enhanced resistance to undergo color darkening upon exposure to light wherein said polybenzimidazole consists essentially of recurring units of the formula:

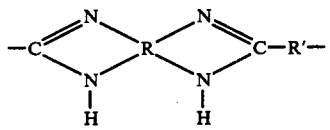

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from 4 to 8 carbon atoms, and (3) a heterocyclic ring selected from the group consisting of (a) pyridine, (b) pyrazine, (c) furan, (d) quinoline, (e) thiophene, and (f) pyran.

3. An improved process in accordance with claim 2 for the formation of a polybenzimidazole solid material having an enhanced resistance to undergo color darkening upon exposure to light wherein said polybenzimidazole is poly-2,2'-(m-phenylene)-5,5'-bibenzimidazole.

4. An improved process in accordance with claim 1 for the formation of a polybenzimidazole solid material having an enhanced resistance to undergo color darkening upon exposure to light wherein said finely divided pigment is provided in said solution in a concentratio of about 0.1 to 8 percent by weight based upon the weight of said dissolved polybenzimidazole.

5. An improved process in accordance with claim 1 for the formation of a polybenzimidazole solid material having an enhanced resistance to undergo color darkening upon exposure to light wherein said finely divided pigment is arsenic thioarsenate.

6. An improved process in accordance with claim 1 for the formation of a polybenzimidazole solid material having an enhanced resistance to undergo color darkening upon exposure to light wherein said finely divided pigment is copper phthalocyanine.

7. An improved process in accordance with claim 1 for the formation of a polybenzimidazole solid material having an enhanced resistance to undergo color darkening upon exposure to light wherein said finely divided pigment is anatase titanium dioxide.

8. An improved process in accordance with claim 1 for the formation of a polybenzimidazole solid material having an enhanced resistance to undergo color darkening upon exposure to light wherein said solvent is removed via dry spinning into an evaporative atmosphere and said resulting polybenzimidazole solid material is a fibrous material.

9. An improved process in accordance with claim 1 for the formation of a polybenzimidazole solid material having an enhanced resistance to undergo color darkening upon exposure to light wherein said solvent is removed by evaporation from a thin layer of said solution and the resulting polybenzimidazole solid material is a film.

10. An improved process in accordance with claim 1 for the formation of a polybenzimidazole solid material having an enhanced resistance to undergo color darkening upon exposure to light wherein said solvent is removed by contact with agitation with a solvent-miscible non-solvent for said polybenzimidazole and said resulting polybenzimidazole solid material is a particulate solid.

11. An improved process in accordance with claim 1 for the formation of a polybenzimidazole solid material having an enhanced resistance to undergo color darkening upon exposure to light wherein said finely divided pigment is substantially uniformly dispersed therein in a concentration of about 0.2 to 3 percent by weight based upon the weight of the polybenzimidazole.

12. An improved process for the formation of a poly-2,2'-(m-phenylene)-5,5'-bibenzimidazole fibrous material having an enhanced resistance to undergo the usual darkening upon exposure to light comprising:
 a. forming a spinning solution comprising (1) a solvent selected from the group consisting essentially of N,N-dimethylacetamide, N,N-dimethylformamide, dimethylsulfoxide, and N-methyl-2-pyrrolidone, (2) about 10 to 45 percent by weight based upon the total weight of the solution of dissolved poly-2,2'-(m-phenylene)-5,5'-bibenzimidazole, and (3) about 0.1 to 8 percent by weight based upon the weight of said poly-2,2'-(m-phenylene)-5,5'-bibenzimidazole of dispersed finely divided pigment selected from the group consisting essentially of arsenic thioarsenate, copper phthalocyanine, anatase titanium dioxide, and mixtures of the foregoing, and
 b. extruding said solution through a shaped orifice into an evaporative atmosphere to form a poly-2,2'-(m-phenylene)-5,5'-bibenzimidazole fibrous material having said finely divided pigment substantially uniformly distributed therein in a concentration of about 0.1 to 8 percent by weight based upon the weight of said poly-2,2'-(m-phenylene)-5,5'-bibenzimidazole.

13. An improved process in accordance with claim 12 for the formation of a poly-2,2'-(m-phenylene)-5,5'-bibenzimidazole fibrous material having an enhanced resistance to undergo color darkening upon exposure to light wherein said solvent is N,N-dimethylacetamide.

14. An improved process in accordance with claim 13 for the formation of a poly-2,2'-(m-phenylene)-5,5'-bibenzimidazole fibrous material having an enhanced resistance to undergo color darkening upon exposure to light wherein said poly-2,2'-(m-phenylene)-5,5'-bibenzimidazole is dissolved in said spinning solution in a concentration of about 20 to 30 percent by weight based upon the total weight of the solution.

15. An improved process in accordance with claim 12 for the formation of a poly-2,2'-(m-phenylene)-5,5'-bibenzimidazole fibrous material having an enhanced resistance to undergo color darkening upon exposure to light wherein said finely divided pigment is arsenic thioarsenate.

16. An improved process in accordance with claim 12 for the formation of a poly-2,2'-(m-phenylene)-5,5'-bibenzimidazole fibrous material having an enhanced resistance to undergo color darkening upon exposure to light wherein said finely divided pigment is copper phthalocyanine.

17. An improved process in accordance with claim 12 for the formation of a poly-2,2'-(m-phenylene)-5,5'-bibenzimidazole fibrous material having an enhanced resistance to undergo color darkening upon exposure to light wherein said finely divided pigment is titanium dioxide.

18. An improved process in accordance with claim 12 for the formation of a poly-2,2'-(m-phenylene)-5,5'-bibenzimidazole fibrous material having an enhanced resistance to undergo color darkening upon exposure to light wherein said finely divided pigment is substantially uniformly distributed within said poly-2,2'-(m-phenylene)-5,5'-bibenzimidazole fibrous material in a concentration of about 0.2 to 3 percent by weight based upon the weight of said poly-2,2'-(m-phenylene)-5,5'-bibenzimidazole.

19. A polybenzimidazole fibrous material exhibiting an enhanced resistance to undergo the usual darkening upon exposure to light comprising about 0.1 to 8 percent by weight based upon the weight of said polybenzimidazole of a finely divided pigment substantially uniformly dispersed therein selected from the group consisting essentially of arsenic thioarsenate, copper phthalocyanine, anatase titanium dioxide, and mixtures of the foregoing.

20. A polybenzimidazole fibrous material in accordance with claim 19 exhibiting an enhanced resistance to undergo the usual darkening upon exposure to light wherein said polybenzimidazole consists essentially of recurring units of the formula:

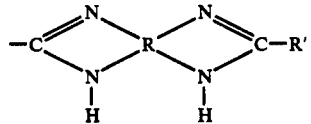

21. A polybenzimidazole fibrous material in accordance with claim 20 exhibiting an enhanced resistance to undergo the usual darkening upon exposure to light wherein said polybenzimidazole is poly-2,2'-(m-phenylene)-5,5'-bibenzimidazole.

22. A polybenzimidazole fibrous material in accordance with claim 21 exhibiting an enhanced resistance to undergo the usual darkening upon exposure to light wherein said finely divided pigment is substantially uniformly dispersed in said poly-2,2'-(m-phenylene)-5,5'-bibenzimidazole fibrous material in a concentration of about 0.2 to 3 percent by weight based upon the weight of said poly-2,2'-(m-phenylene)-5,5'-bibenzimidazole.

23. A polybenzimidazole fibrous material in accordance with claim 22 exhibiting an enhanced resistance to undergo the usual darkening upon exposure to light wherein said pigment is arsenic thioarsenate.

24. A polybenzimidazole fibrous material in accordance with claim 22 exhibiting an enhanced resistance to undergo the usual darkening upon exposure to light wherein said pigment is copper phthalocyanine.

25. A polybenzimidazole fibrous material in accordance with claim 22 exhibiting an enhanced resistance to undergo the usual darkening upon exposure to light wherein said pigment is anatase titanium dioxide.

26. An improved solution suitable for the formation of shaped polybenzimidazole articles comprising:
 a. a solvent capable of dissolving the polybenzimidazole which is selected from the group consisting essentially of N,N-dimethylacetamide, N,N-dimethylformamide, dimethylsulfoxide, and N-methyl-2-pyrrolidone,
 b. dissolved polybenzimidazole, and
 c. a minor concentration sufficient to stabilize the color of the resulting shaped polybenzimidazole article of a finely divided pigment which is dispersed in said solution selected from the group consisting essentially of arsenic thioarsenate, copper phthalocyanine, anatase titanium dioxide, and mixtures of the foregoing.

27. An improved solution suitable for the formation of shaped polybenzimidazole articles in accordance with claim 26 wherein said polybenzimidazole consists essentially of recurring units of the formula:

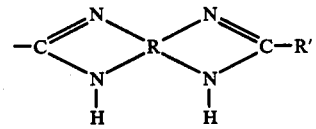

28. An improved solution suitable for the formation of shaped polybenzimidazole articles in accordance with claim 27 wherein said polybenzimidazole is poly-2,2'-(m-phenylene)-5,5'-bibenzimidazole.

29. An improved solution suitable for the formation of shaped polybenzimidazole articles in accordance with claim 26 wherein said solvent is N,N-dimethylacetamide.

30. An improved solution suitable for the formation of shaped polybenzimidazole articles in accordance with claim 26 wherein said finely divided pigment is arsenic thioarsenate.

31. An improved solution suitable for the formation of shaped polybenzimidazole articles in accordance with claim 26 wherein said finely divided pigment is copper phthalocyanine.

32. An improved solution suitable for the formation of shaped polybenzimidazole articles in accordance with claim 26 wherein said finely divided pigment is anatase titanium dioxide.

* * * * *